United States Patent
Hsu et al.

(10) Patent No.: US 12,470,390 B2
(45) Date of Patent: Nov. 11, 2025

(54) ACCESS-POINT PASSPHRASE IDENTIFICATION USING KEY MATCHING

(71) Applicant: ARRIS Enterprises LLC, Suwanee, GA (US)

(72) Inventors: Wei-Sheng Hsu, San Jose, CA (US); Chiu-Yi Li, Taipei (TW); Weichih Huang, New Taipei (TW)

(73) Assignee: Ruckus IP Holdings LLC, Claremont, NC (US)

( * ) Notice: Subject to any disclaimer, the term of this patent is extended or adjusted under 35 U.S.C. 154(b) by 466 days.

(21) Appl. No.: 17/968,841

(22) Filed: Oct. 19, 2022

(65) Prior Publication Data

US 2023/0140517 A1 May 4, 2023

Related U.S. Application Data (60) Provisional application No. 63/272,761, filed on Oct. 28, 2021.

(51) Int. Cl.
*H04L 9/32* (2006.01)

(52) U.S. Cl.
CPC .......... *H04L 9/3226* (2013.01); *H04L 9/3268* (2013.01)

(58) Field of Classification Search
CPC ... H04L 9/3226; H04L 9/3268; H04L 9/3263; H04L 9/0863
See application file for complete search history.

(56) References Cited

U.S. PATENT DOCUMENTS

| | | | |
|---|---|---|---|
| 9,674,892 B1* | 6/2017 | Li | H04L 63/123 |
| 2013/0103939 A1 | 4/2013 | Radpour | |
| 2015/0244711 A1 | 8/2015 | Venkataraman et al. | |
| 2020/0314649 A1 | 10/2020 | Yen | |
| 2021/0075618 A1 | 3/2021 | Stephenson et al. | |
| 2021/0195414 A1* | 6/2021 | Henry | H04W 12/069 |
| 2021/0360400 A1* | 11/2021 | Ficara | H04W 12/37 |

OTHER PUBLICATIONS

"PCT Search Report and Written Opinion in corresponding patent application No. PCTUS2278403 mailed Jan. 24, 2023, 10 pages".

* cited by examiner

*Primary Examiner* — Henry Tsang
(74) *Attorney, Agent, or Firm* — Steven Stupp (57) ABSTRACT

A computer network device that performs key matching is described. While attempting to establish a secure connection with an electronic device, the computer network device may receive a connection-request message associated with the electronic device. In response, the computer network device may provide a context message addressed to a computer, where the context message requests stored passphrase information associated with the electronic device. Then, the computer network device may receive, associated with the computer, a context response. When the context response indicates that there is no stored passphrase information associated with the electronic device, the computer network device may perform the key matching to identify the passphrase associated with the electronic device. Next, the computer network device may provide, addressed to the computer, the identified passphrase associated with the electronic device or an encryption key corresponding to the identified passphrase for storage by the computer.

20 Claims, 7 Drawing Sheets

ACCESS-POINT PASSPHRASE IDENTIFICATION USING KEY MATCHING

CROSS REFERENCE TO RELATED APPLICATIONS

This application claims priority under 35 U.S.C. 119(e) to U.S. Provisional Application Ser. No. 63/272,761, "Access-Point Passphrase Identification Using Key Matching," filed on Oct. 28, 2021, by Wei Sheng Hsu, et al., the contents of which are herein incorporated by reference.

FIELD

The described embodiments relate to techniques for offloading at least a portion of an authentication process from an authentication computer to an authenticator.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

One challenge is managing a network is how to securely authenticate electronic devices before they are allowed to establish connections to a network, such as a WLAN. Some authentication techniques (such as WPA2-Personal) are based on pre-shared keys that are provided to an electronic device. In these authentication techniques, information associated with a cryptographical calculation that is based on cryptographic information (such as a passphrase, which is sometime referred to as a dynamic pre-shared key or DPSK) is reproduced by the network, thereby authenticating the electronic device.

In many existing networks, these calculations are performed by an authentication computer, such as a remote authentication dial-in user service (RADIUS) server. Because the authentication computer does not know in advance which pre-shared key is being used by a particular electronic device, the authentication computer typically needs to perform pre-shared key matching by systematically performing calculations on multiple possible pre-shared keys until a match is found. Consequently, these calculations are computationally intense and, thus, are time-consuming and can adversely impact connectivity (e.g., by causing delays). Moreover, in order to prevent the authentication computer from become overwhelmed or a bottleneck during authentication, there are often constraints on scaling. For example, the number of access points and pre-shared keys supported by an authentication computer in a given region in a network may be restricted.

SUMMARY

A computer network device (such as an access point) that performs key matching is described. This computer network device may include: an interface circuit that communicates with an electronic device and a computer; a processor; and a memory that stores program instructions, where, when executed by the processor, the program instructions cause the computer network device to perform operations. Notably, while attempting to establish a secure connection with the electronic device, the computer network device receives an authentication request associated with the electronic device. In response, the computer network device provides a context message addressed to the computer, where the context message requests stored passphrase information (such as a DPSK, another type of digital certificate, and/or an encryption key corresponding to the passphrase) associated with the electronic device. Then, the computer network device receives, associated with the computer, a context response. When the context response indicates that there is no stored passphrase information associated with the electronic device, the computer network device performs the key matching to identify the passphrase associated with the electronic device. Next, the computer network device provides, addressed to the computer, the identified passphrase associated with the electronic device and/or the encryption key (such as a pairwise master key or PMK) corresponding to the identified passphrase for storage by the computer.

Moreover, after performing the key matching, the computer network device may establish the secure connection with the electronic device based at least in part on the identified passphrase (and/or the encryption key or, more generally, information corresponding to the identified passphrase).

Furthermore, the computer network device may store the passphrase and/or the encryption key in memory associated with the computer network device.

Additionally, after receiving the context response and before performing the key matching, the computer network device may provide a notification addressed to the computer that indicates that the computer network device is performing or will perform the key matching.

Note that, after receiving the context response and before performing the key matching, the computer network device may exchange authentication parameters with the electronic device, and the key matching may be based at least in part on the authentication parameters. For example, the computer network device may provide, addressed to the electronic device, a first message in a four-way handshake with the electronic device. This first message may include a random number associated with the computer network device (such as an ANonce). Moreover, the computer network device may receive, associated with the electronic device, a second message in the four-way handshake with the electronic device. This second message may include a second random number associated with the electronic device (such as the SNonce) and a message integrity check (MIC). In some embodiments, the second message includes: the inputs to a cryptographic calculation (such as a pseudo-random function) and the output of a cryptographic calculation.

In some embodiments, when the context response includes or specifies the stored passphrase information, the computer network device may not perform the key matching. Instead, the computer network device may establish the secure connection with the electronic device based at least in part on the passphrase information (such as the passphrase and/or the encryption key).

Moreover, the computer may include a controller for the computer network device.

Furthermore, the computer may include a RADIUS server or an authentication, authorization, and accounting (AAA) server.

Additionally, the computer network device may include a second processor, and the key matching may be performed by the second processor.

In some embodiments, when the electronic device discontinues attempting to establish the secure connection while the computer network device is performing the key matching, the computer network device may continue to perform the key matching and, when the passphrase is identified, may provide the identified passphrase and/or the encryption key addressed to the computer.

Another embodiment provides the electronic device that performs counterpart operations to at least some of the aforementioned operations of the computer network device.

Another embodiment provides the computer that performs counterpart operations to at least some of the aforementioned operations of the computer network device.

Another embodiment provides a system that includes the computer network device and/or the computer.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by one of the aforementioned components. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A computer network device (such as an access point) that performs key matching is described. While attempting to establish a secure connection with an electronic device, the computer network device may receive a connection-request message associated with the electronic device. In response, the computer network device may provide a context message addressed to a computer, where the context message requests stored passphrase information associated with the electronic device (such as a DPSK, another type of digital certificate or an encryption key corresponding to the passphrase). Then, the computer network device may receive, associated with the computer, a context response. When the context response indicates that there is no stored passphrase information associated with the electronic device, the computer network device may perform the key matching to identify the passphrase associated with the electronic device. Next, the computer network device may provide, addressed to the computer, the identified passphrase associated with the electronic device and/or the encryption key (such as a PMK) for storage by the computer. This may eliminate a need for the computer network device to subsequently perform the key matching.

By performing the key matching using the computer network device, these communication techniques may facilitate authentication and secure access to the network. Notably, the communication techniques may provide reliable authentication and secure access to the network without the computer becoming a bottleneck or delaying the authentication of the electronic device. In the process, the communication techniques may allow the authentication to be scaled, e.g., to a large number of passphrases in a given region (such as a zone) in a network. Consequently, the communication techniques may reduce frustration of the users and network operators or network administrators, and may improve the user experience when using in the network.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

Figure 1:
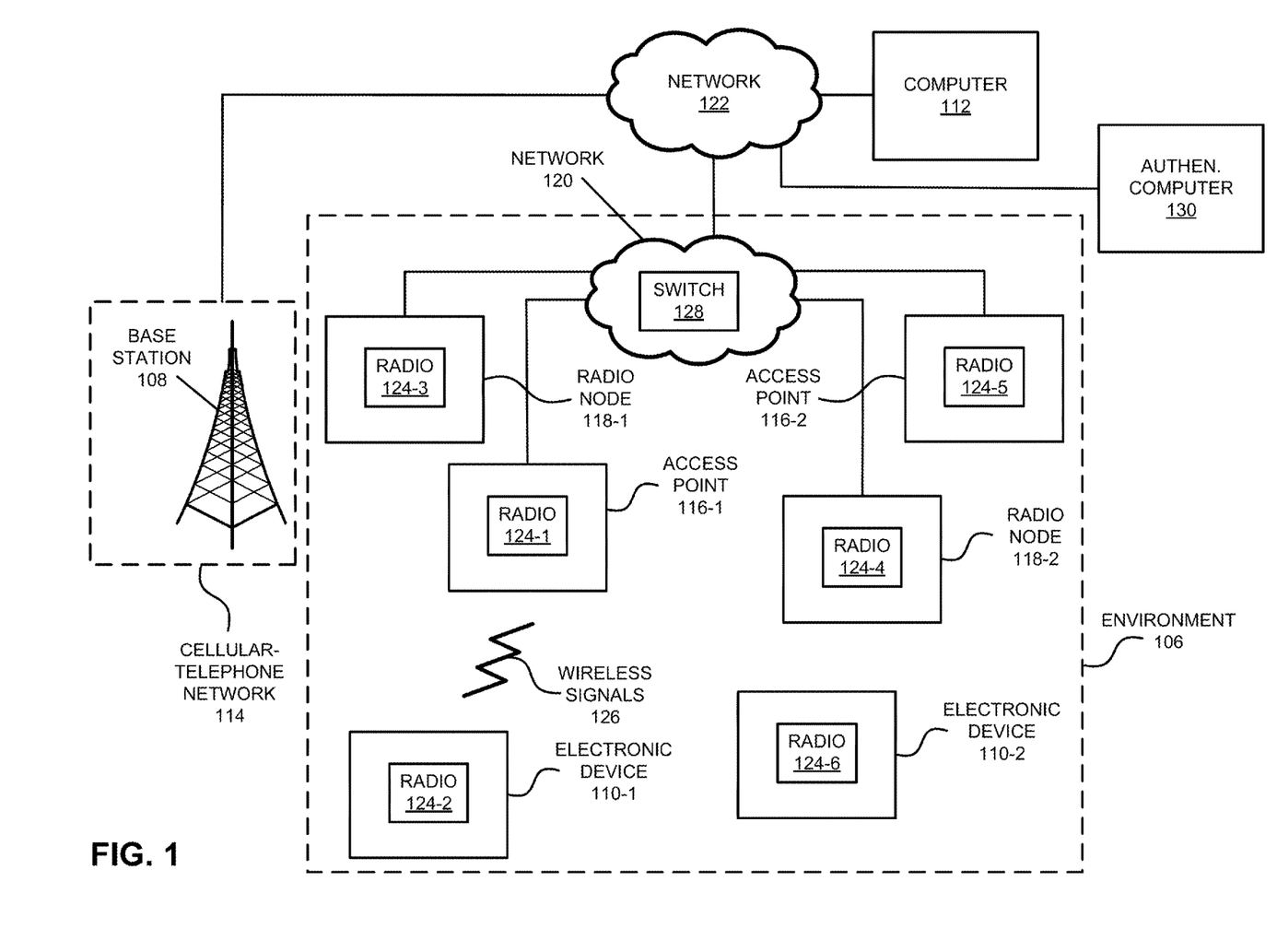
FIG. 1 is a block diagram illustrating an example of communication among electronic devices in accordance with an embodiment of the present disclosure.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, computer 112 (which may be a cloud-based controller that manages and/or configures access points 116 radio nodes 118 and/or switch 128, or that provides cloud-based storage and/or analytical services, and which may, in generally, be a computer system that includes one or more computers) and/or authentication computer 130 (such as a RADIUS server and/or an AAA server) using a wired communication protocol (such as Ethernet) via network 120 and/or 122. In some embodiments, computer 112 may perform some or all of the functions of authentication computer 130. Moreover, note that networks 120 and 122 may be the same or different networks. For example, networks 120 and/or 122 may an LAN, an intra-net or the Internet. In some embodiments, network 120 may include one or more routers and/or switches (such as switch 128).

Figure 7:
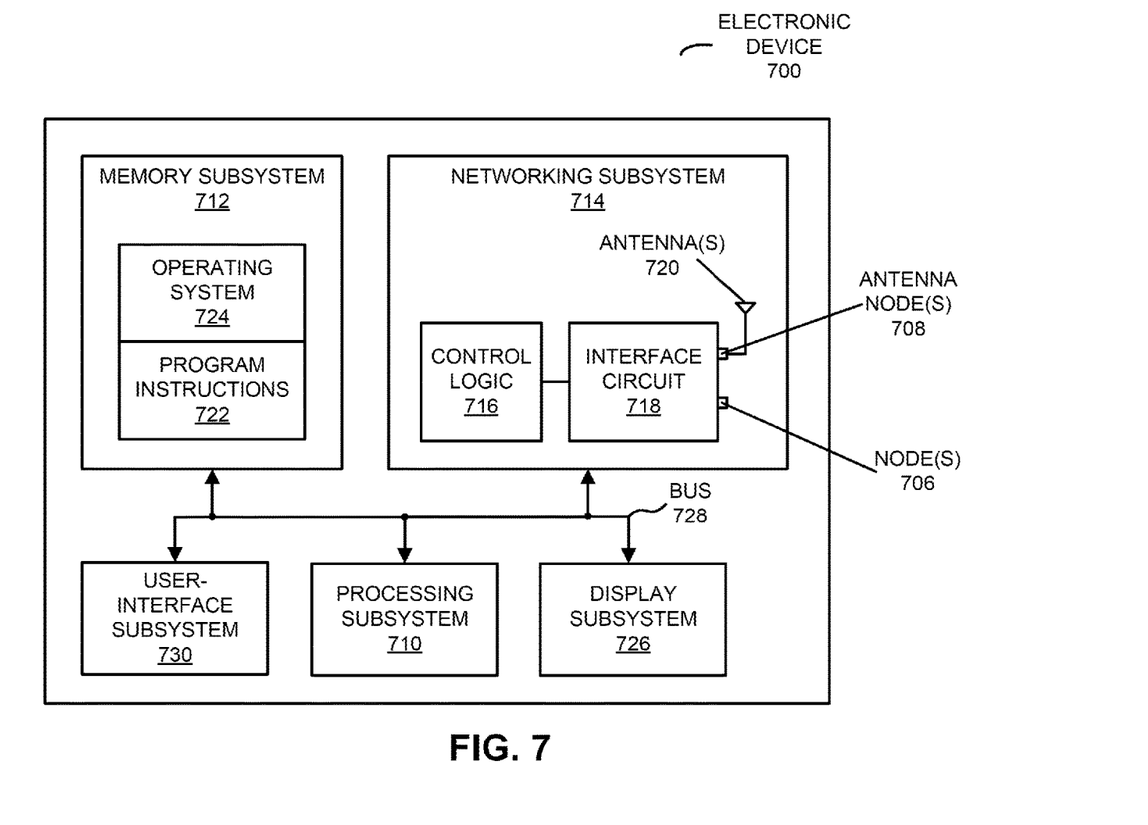
FIG. 7 is a block diagram illustrating an example of an electronic device in accordance with an embodiment of the present disclosure.

As described further below with reference to FIG. 7, electronic devices 110, computer 112, access points 116, radio nodes 118, switch 128 and authentication computer 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, when authentication computer 130 performs key matching during authentication of electronic devices 110, the authentication can be time-consuming and complicated, which may constrain or limit scaling. For example, the number of access points 116 and passphrases supported by authentication computer 130 in a given region in a network may be restricted.

Moreover, as described further below with reference to FIGS. 2-6, in order to address these problems, a computer-network device (such as access point 116-1, radio node 118-1 or switch 128) may perform the disclosed communication techniques. In the discussion that follows, an access point, such as access point 116-1, is used to illustrate the communication techniques.

During operation, an electronic device 110-1 may discover and associate with (or establish a connection with) access point 116-1 (and, thus, with a network, such as a WLAN and/or network 120, provided by access point 116-1). For example, electronic device 110-1 may provide an authentication request to access point 116-1. Then, access point 116-1 may provide a user-equipment context request to computer 112, where the context message requests stored passphrase information associated with electronic device 110-1 (such as a DPSK, another type of digital certificate or an encryption key corresponding to the DPSK, e.g., a PMK). Computer 112 may subsequently provide a user-equipment context response to access point 116-1, which may indicate that there is no existing context or association for electronic device 110-1 in the WLAN. For example, the context response may indicate that there is no stored passphrase information associated with electronic device 110-1.

Moreover, access point 116-1 may provide an authentication response to electronic device 110-1. Next, electronic device 110-1 may provide an association request to access point 116-1, which may respond by providing an association response to electronic device 110-1. Note that at this point, while there is a connection between electronic device 110-1 and access point 116-2, there communication is not yet secure.

Then, access point 116-1 may perform the authentication during a four-way handshake with electronic device 110-1. Notably, after providing the association response to electronic device 110-1, access point 116-1 may provide, to electronic device 110-1, a first message in the four-way handshake with electronic device 110-1. This first message may include a random number associated with access point 116-1 (which is sometimes referred to as an 'ANonce'). In response, electronic device 110-1 may construct, derive or generate a pairwise transient key (PTK). For example, the PTK may be constructed or generated using a cryptographic calculation (such as a pseudo-random function) and optionally a passphrase (such as a pre-shared key, e.g., a DPSK or another type of digital certificate), the ANonce, a second random number associated with electronic device 110-1 (which is sometimes referred to as an 'SNonce'), an identifier of access point 116-1 (such as a media access control or MAC address of access point 116-1), and/or an identifier of electronic device 110-1 (such as a MAC address of electronic device 110-1). Note that the passphrase may be preinstalled or preconfigured on electronic device 110-1 and may be stored in memory that is accessible by access point 116-1. In some embodiments, a user of electronic device 110-1 may receive the passphrase and install it on electronic device 110-1 using a portal (such as website or web page), an email, an SMS message, etc.

Note that the passphrase may be independent of an identifier associated with electronic device 110-1, such as the MAC address of electronic device 110-1. More generally, the passphrase may be independent of electronic device 110-1 or hardware in electronic device 110-1. The passphrase may be associated with a location, such as a room, a building, a communication port (such as a particular Ethernet port), etc. (In general, in the present discussion a 'location' may not be restricted to a physical location, but may be abstracted to include an object or entity associated with a physical location, such as a particular room or building.) Alternatively or additionally, the passphrase may be associated with one or more users, such as a guest or family in a hotel. Thus, in some embodiments, the passphrase includes a common passphrase that is shared by a group of electronic devices (e.g., the common passphrase may be a group DPSK).

Furthermore, electronic device 110-1 may provide a second message in the four-way handshake to access point 116-1. The second message may include the SNonce and a message integrity check (MIC) to access point 116-1. In some embodiments, the second message includes: the inputs to the cryptographic calculation and an output of the cryptographic calculation.

Additionally, instead of providing an access request to authentication computer 130 with authentication parameters, so that authentication computer 130 can perform key matching to identify the passphrase associated with electronic device 110-1, access point 116-1 may perform the key matching. Notably, access point 116-1 may perform authentication and authorization of electronic device 110-1, including comparing cryptographic information specified by passphrase parameters (which may be included in the authentication parameters) with stored information in or associated with access point 116-1 (such as the DPSK or the other type of digital certificate) for electronic device 110-1. More generally, access point 116-1 may use information specified by the passphrase or authentication parameters to determine whether electronic device 110-1 is authorized to access network 120 and/or network 122. Note that the passphrase parameters may include: the inputs to the cryptographic calculation and the output of the cryptographic calculation. For example, the passphrase parameters may include: the ANonce, the SNonce, the MIC, the MAC address of electronic device 110-1, and/or the MAC address of access point 116-1. In addition, the passphrase parameters may include other information, such as: a cluster name, a zone name, a service set identifier (SSID) of the WLAN, a basic service set identifier (BSSID) of access point 116-1, and a username of the user.

In some embodiments, access point 116-1 may perform brute-force calculations of outputs of the cryptographic calculation based at least in part on the inputs to the cryptographic calculation and different stored passphrases. For example, access point 116-1 may include a separate processor that performs the key matching. When there is a match between one of the calculated outputs and the output received from electronic device 110-1, it may confirm that access point 116-1 is able to construct, derive or generate the same PTK as electronic device 110-1, so that electronic device 110-1 and access point 116-1 will be able to encrypt and decrypt their communication with each other, and thus will be able to establish secure communication with each other. (Alternatively, instead of performing the brute-force calculations, authentication computer 130 may have previously provided the output of the cryptographic calculation to access point 116-1, and which access point 116-1 may store in memory, so access point 116-1 can directly confirm that there is match with the output received from electronic device 110-1.)

Then, access point 116-1 may optionally access a policy associated with the user (which may be included in the authentication parameters and/or by performing a look up based at least in part on an identifier of the user, such as a username of the user) that governs the access to a WLAN (and, more generally, to network 120 and/or network 122). For example, the policy may include the policy may include a time interval when the passphrase is valid. Moreover, the policy may include a location where the passphrase is valid (such as a location of access point 116-1) or the network that the user is allowed to access. In some embodiments, access point 116-1 may communicate with a property management (PM) server (not shown), which is associated with an organization, to determine whether electronic device 110-1 is associated with the location (such as whether a user of electronic device 110-1 is checked into or associated with a room where access point 116-1 is located). Note that the location may include: a room, a building, a communication port, a facility associated with the organization (such as a hotel or an education institution), etc. More generally, access point 116-1 may optionally communicate with the PM server to determine whether one or more criteria associated with the policy are met.

When there is match of the outputs of the cryptographic calculation and/or one or more criteria associated with the policy are met (and, thus, when the key matching identifies the passphrase associated with electronic device 110-1), access point 116-1 may provide the identified passphrase associated with electronic device 110-1 and/or an encryption key corresponding to the identified passphrase (such as a PMK) to computer 112 for storage by computer 112. This stored passphrase and/or encryption key may be used by access point 116-1 (or another one of access points 116) to efficiently and quickly establish a secure connection with electronic device 110-1 during a subsequent association and authentication of electronic device 110-1, thereby eliminating a need for access point 116-1 or the other one of access points 116 to perform the key matching. Moreover, access point 116-1 may store the identified passphrase and/or the encryption key (and, more generally, information corresponding to the identified passphrase) and an identifier specifying electronic device 110-1 (such as a MAC address associated with electronic device 110-1) in memory in or associated with access point 116-1.

In some embodiments, after receiving the context response and before performing the key matching, access point 116-1 may provide a notification to computer 112 that indicates that access point 116-1 is performing or will perform the key matching. This may prevent computer 112, authentication computer 130 and/or another one of access point 116 from redundantly performing the key matching while it is being performed by access point 116-1. Moreover, when the context response includes or specifies the stored passphrase information, access point 116-1 may not perform the key matching. Instead, as describe further below, access point 116-1 may complete the four-way handshake and establish the secure connection with electronic device 110-1 based at least in part on the passphrase information (such as the passphrase and/or the encryption key). Furthermore, when electronic device 110-1 discontinues attempting to establish the secure connection with access point 116-1 (e.g., because a timeout elapses before the key matching is completed) while access point 116-1 is performing the key matching, access point 116-1 may still continue to perform the key matching and, when the passphrase is identified, may provide the identified passphrase and/or the encryption key to computer 112.

After the passphrase is identified (or when the key matching is not performed by access point 116-1 because the context response includes the passphrase associated with electronic device 110-1), access point 116-1 may provide access acceptance information in a third message in the four-way handshake to electronic device 110-1. This third message may include information for establishing secure access of electronic device 110-1. For example, the access acceptance information may include: an identifier of electronic device 110-1, a tunnel type, a tunnel medium type, a tunnel privilege group identifier, a filter identifier, and the username.

Furthermore, electronic device 110-1 may provide a fourth message in the four-way handshake to access point 116-1, such as an acknowledgment. At this point, access point 116-1 may establish the secure connection or secure access to the WLAN for electronic device 110-1 (and, more generally, secure access to network 120 and/or network 122, such as an intranet or the Internet). Notably, the secure connection or the secure access may be in a personal area network (PAN) in the WLAN, which is independent of traffic associated with other PANs in the WLAN.

In some embodiments, the secure access may be implemented using a virtual network associated with the location (such as a virtual network for the PAN), and the information in the access acceptance information may allow electronic device 110-1 to establish secure communication with the virtual network. This secure communication may be independent of traffic associated with other users of the WLAN. For example, access point 116-1 may bridge traffic between electronic device 110-1 and another member of a group of electronic devices (such as electronic device 110-2) in the virtual network in the WLAN, where the traffic in the virtual network is independent of other traffic associated with one or more different virtual networks in the network. Note that the virtual network may include a VLAN. Alternatively, when the aforementioned operations of access point 116-1 are performed by switch 128, the virtual network may include a VXLAN. In these embodiments, switch 128 may bridge wired traffic (such as Ethernet frames) associated with electronic device 110-1 in virtual network.

Moreover, the virtual network may be specified by an identifier that is included in the access acceptance information. For example, the identifier may include a VLANID (for use with access point 116-1) or a VNI (for use with switch 128). Moreover, the identifier may include information that is capable of specifying more than 4,096 virtual networks. In some embodiments, the identifier may include 24 bits, which can be used to specify up to 16 million virtual networks.

In some embodiments, the virtual network is implemented in a virtual dataplane in access point 116-1 (such as using a generic routing encapsulation or GRE tunnel). Note that a dataplane is generally responsible for moving data around transmit paths, while a control plane is generally responsible for determining and setting up those transmit paths. The dataplane may be implemented using virtual machines that are executed by multiple cores in one or more processors (which is sometimes referred to as a 'virtual dataplane'), which allows the dataplane to be flexibly scaled and dynamically reconfigured. In the present discussion, a virtual machine is an operating system or application environment that is implemented using software that imitates or emulates dedicated hardware or particular functionality of the dedicated hardware.

Additionally, in some embodiments, the policy may allow the user to access multiple networks at different locations (such as different geographic locations, e.g., different hotels in a hotel brand or chain). In these embodiments, the inputs used to calculate the one or more second outputs of the cryptographic calculation may include a given identifier of a given network (such as a given SSID). Moreover, one or more stored passphrases may be organized based at least in part on identifiers of different networks. In these embodiments, related stored passphrases may be grouped based at least in part on a given network that a user is asking to join, which may reduce the computational time need by access point 116-1 to calculate the outputs for the different stored passphrases.

In these ways, the communication techniques may offload the key matching to an authenticator, such as access point 116-1. Notably, the communication techniques may allow access point 116-1 to selectively authenticate and provide secure access by electronic device 110-1 to a network. This capability may allow dynamic secure access to the network (such as access at one or more locations and/or at different times) without authentication computer 130 becoming a bottleneck or delaying the authentication of electronic devices 110. Therefore, the communication techniques may allow the authentication to be scaled to a large number of access points 116 and/or passphrases in a region (such as a zone) in a WLAN or a network, such as network 120. Consequently, the communication techniques may improve the user experience when using electronic device 110-1, access point 116-1 and communicating via the network.

While the preceding discussion illustrated the communication techniques with communication between access point 116-1 (and, more generally, a computer network device) and electronic device 110-1, in other embodiments this communication may be mediated by one or more other components and/or may involve communication with the one or more other components.

Figure 2:
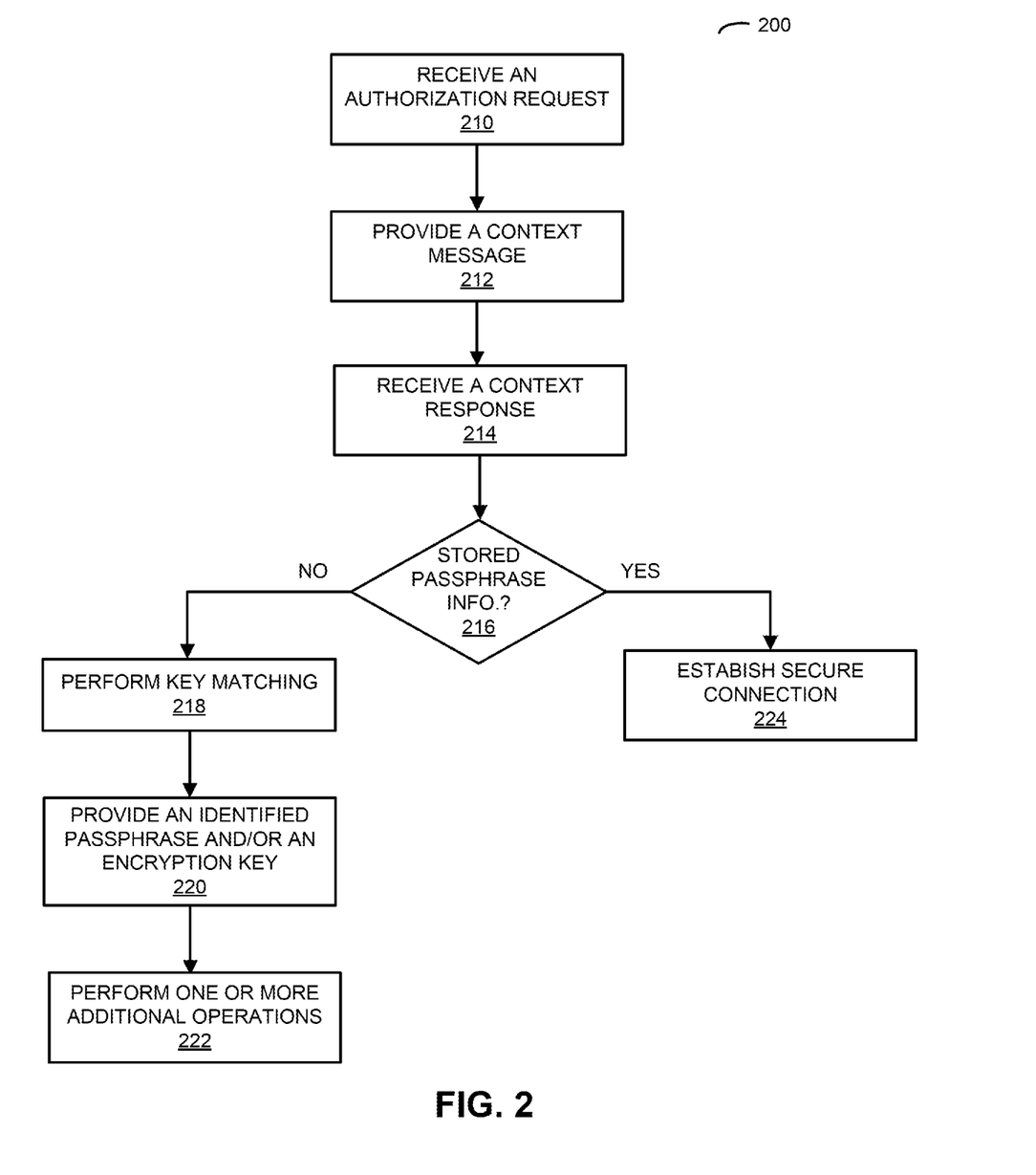
FIG. 2 is a flow diagram illustrating an example of a method for performing key matching using an electronic device in FIG. 1 in accordance with an embodiment of the present disclosure.

We now describe embodiments of the method. FIG. 2 presents a flow diagram illustrating an example of a method 200 for performing key matching, which may be performed by a computer network device, such as one of access points 116, one of radio nodes 118 or switch 128 in FIG. 1. During operation, while attempting to establish a secure connection with the electronic device, the computer network device may receive an authentication request (operation 210) associated with the electronic device.

In response, the computer network device may provide a context message (operation 212) addressed to the computer, where the context message requests stored passphrase information (such as a DPSK or another type of digital certificate) associated with the electronic device. Note that the computer may include: a controller for the computer network device; a RADIUS server; and/or an AAA server.

Then, the computer network device may receive, associated with the computer, a context response (operation 214). When the context response indicates that there is no stored passphrase information (operation 216) associated with the electronic device, the computer network device may perform the key matching (operation 218) to identify the passphrase associated with the electronic device. Next, the computer network device provides, addressed to the computer, the identified passphrase (operation 220) associated with the electronic device and/or an encryption key corresponding to the identified passphrase (such as a PMK) for storage by the computer. This may eliminate a need for the computer network device (or another computer network device) to subsequently perform the key matching 326.

In some embodiments, the electronic device may optionally perform one or more additional operations (operation 222). Notably, after performing the key matching (operation 218), the computer network device may establish the secure connection with the electronic device based at least in part on the identified passphrase and/or the encryption key (and, more generally, information corresponding to the identified passphrase). Furthermore, the computer network device may store the passphrase in memory associated with the computer network device.

Additionally, after receiving the context response (operation 214) and before performing the key matching (operation 218), the computer network device may provide a notification addressed to the computer that indicates that the computer network device is performing or will perform the key matching.

Note that, after receiving the context response (operation 214) and before performing the key matching (operation 218), the computer network device may exchange authentication parameters with the electronic device, and the key matching may be based at least in part on the authentication parameters. For example, the computer network device may provide, addressed to the electronic device, a first message in a four-way handshake with the electronic device. This first message may include a random number associated with the computer network device (such as an ANonce). Moreover, the computer network device may receive, associated with the electronic device, a second message in the four-way handshake with the electronic device. This second message may include a second random number associated with the electronic device (such as the SNonce) and a message integrity check (MIC). In some embodiments, the second message includes: the inputs to a cryptographic calculation (such as a pseudo-random function) and the output of a cryptographic calculation.

In some embodiments, when the context response includes or specifies the stored passphrase information (operation 216), the computer network device may not perform the key matching. Instead, the computer network device may establish the secure connection (operation 224) with the electronic device based at least in part on the stored passphrase information (such as the passphrase and/or the encryption key).

Additionally, the computer network device may include a second processor, and the key matching may be performed by the second processor.

In some embodiments, when the electronic device discontinues attempting to establish the secure connection while the computer network device is performing the key matching, the computer network device may continue to perform the key matching and, when the passphrase is identified, may provide the identified passphrase and/or the encryption key addressed to the computer.

Furthermore, the four-way handshake may include or may be compatible with an Extensible Authentication Protocol (EAP) over LAN (EAPoL).

In some embodiments of method 200, there may be additional or fewer operations. Furthermore, the order of the operations may be changed, and/or two or more operations may be combined into a single operation.

Figure 3:
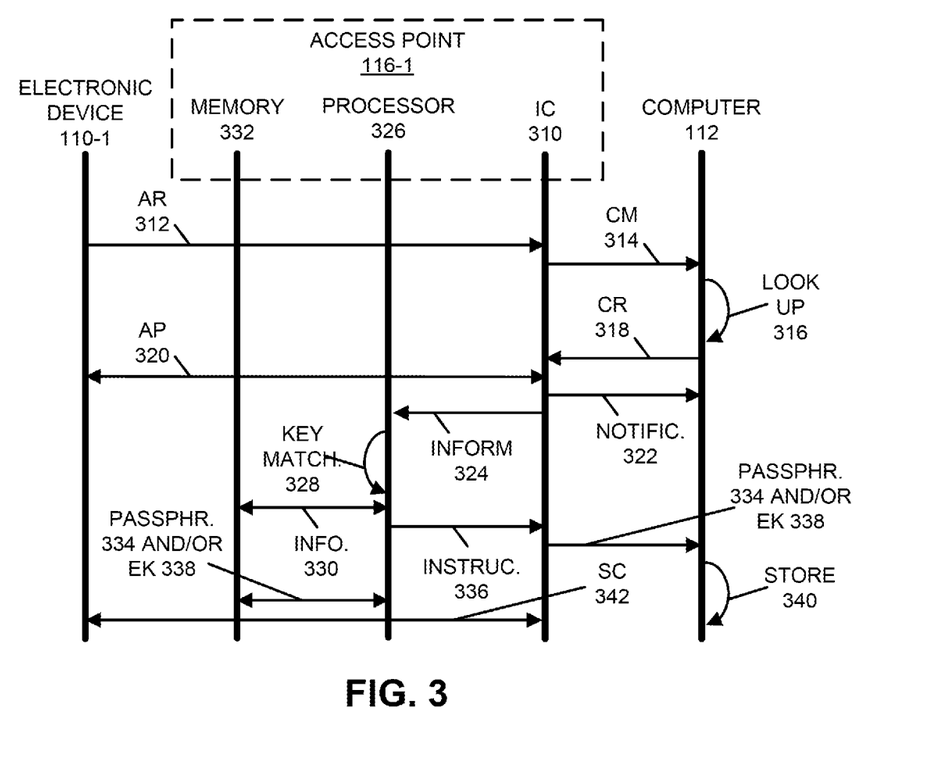
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication among electronic device 110-1, access point 116-1, and computer 112. In FIG.

3, electronic device 110-1 may discover and may provide an authentication request (AR) 312 to access point 116-1 via an interface circuit (IC) 310 in access point 116-1. In response, interface circuit 310 may provide a context message (CM) 314 to computer 112, where context message 314 requests stored passphrase information (such as a DPSK or another type of digital certificate) associated with electronic device 110-1.

After receiving context message 314, computer 112 may perform a look up 316 (e.g., based at least in part on an identifier associated with electronic device 110-1) in memory associated with computer 112 to determine whether the passphrase associated with electronic device 110-1 and/or an encryption key corresponding to the passphrase (such as a PMK) is stored in memory. Then, the computer 112 may provide a context response (CR) 318 to access point 116-1.

Next, interface circuit 310 may receive context response 318. Moreover, interface circuit 310 may exchange authentication parameters (AP) 320 with electronic device 110-1. When context response 318 indicates that there is no stored passphrase information associated with electronic device 110-1, interface circuit 310 may provide notification 322 to computer 112, which indicates that access point 116-1 is performing or will perform key matching 328 to identify a passphrase 334 associated with electronic device 110-1. Moreover, interface circuit 310 may inform 324 a processor 326 in access point 116-1 to perform key matching 328 based at least in part on the authentication parameters 320. Processor 326 may perform key matching 328 to identify a passphrase 334 associated with electronic device 110-1. Notably, processor 326 may compute outputs of a cryptographic calculation based at least in part on the authentication parameters 320, and may compare results of the cryptographic calculation with stored information 330 in memory 332 in access point 116-1.

After identifying passphrase 334, processor 326 may instruct 336 interface circuit 310 to provide passphrase 334 and/or an encryption key (EK) 338 corresponding to passphrase 334 to computer 112. Moreover, after receiving passphrase 334 and/or the encryption key 338, computer 112 may store 340 passphrase 334 and/or the encryption key 338 and the identifier associated with electronic device 110-1 in the memory associated with computer 112. This may eliminate a need for an access point (such as access point 116-1) to subsequently perform the key matching 328. Furthermore, processor 326 may store passphrase 334 and/or the encryption key 338 and the identifier associated with electronic device 110-1 in memory 332. Additionally, interface circuit 310 may establish a secure connection (SC) 342 with electronic device 110-1 based at least in part on passphrase 334 and/or the encryption key 338.

Alternatively, when context response 316 includes or specifies the stored passphrase information, access point 116-1 may not perform key matching 328. Instead, access point 116-1 may establish secure connection 342 with electronic device 110-1 based at least in part on the stored passphrase information, such as passphrase 334 and/or the encryption key 338.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe the communication techniques. Because an electronic device (which is sometimes referred to as a 'client') usually gives up waiting for an EAPol encryption key when attempting to establish a secure connection with an access point after approximately 400~500 ms, it may be advantageous to the key matching calculation time as short as possible. However, because of limited computing power, the number of DPSKs that can be used by an access point may be limited to, e.g., 500. The disclosed communication techniques may increase the number of supported DPSKs.

Figure 4:
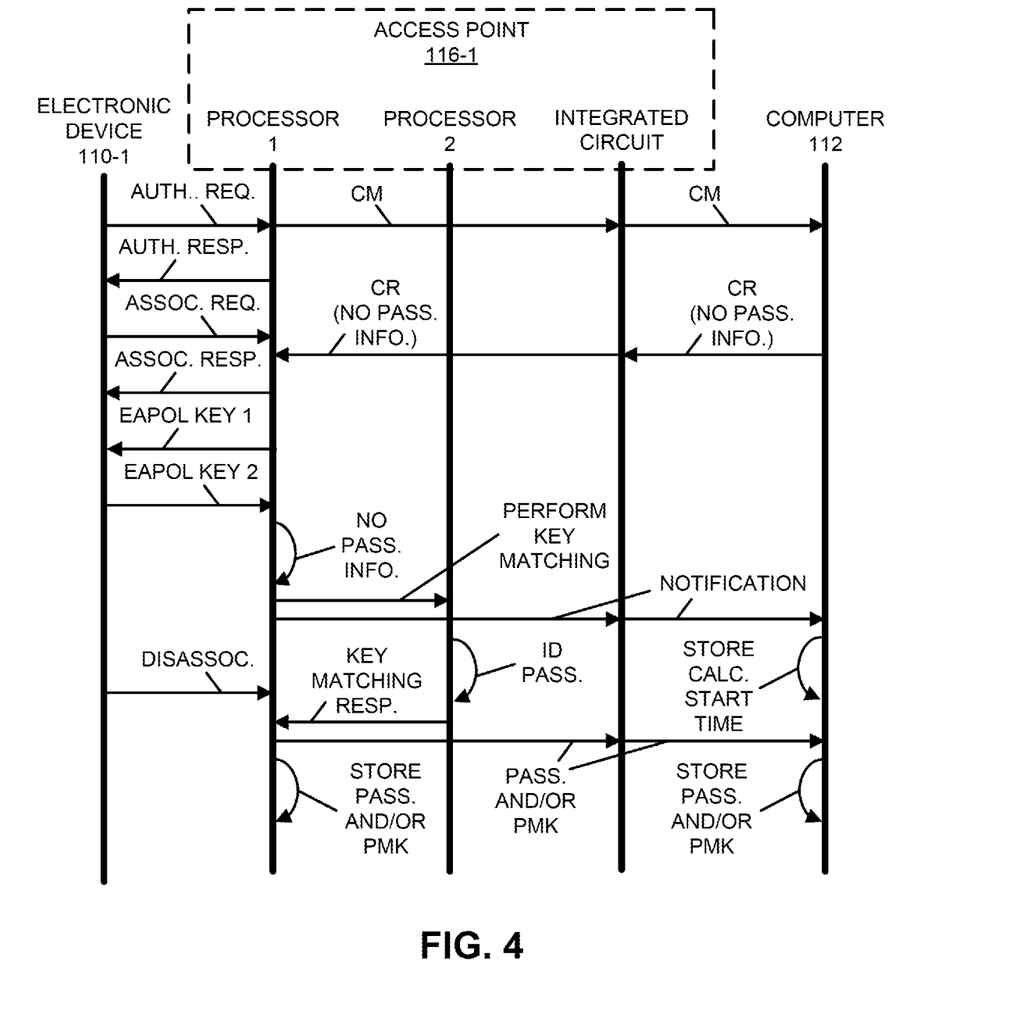
FIG. 4 is a drawing illustrating an example of communication among the electronic devices in FIG. 1 in accordance with an embodiment of the present disclosure.

As shown in FIG. 4, which presents a drawing illustrating an example of communication among electronic device 110-1, access point 116-1 and computer 112, key matching may be performed by a separate processor in access point 116-1. Moreover, the key matching calculation may be continued even after electronic device 110-1 gives up its connection attempt so that the calculation time is not wasted.

In some embodiments, electronic device 110-1 may experience a connection failure the first time electronic device 110-1 attempts to establish a secure connection with a network because the key matching calculation may take some time. For example, electronic device 110-1 may give up waiting for access point 116-1 and may try to connect with the other access point (the time needed for the key matching calculation may depend on the number of DPSKs configured on a particular access point).

Figure 5:
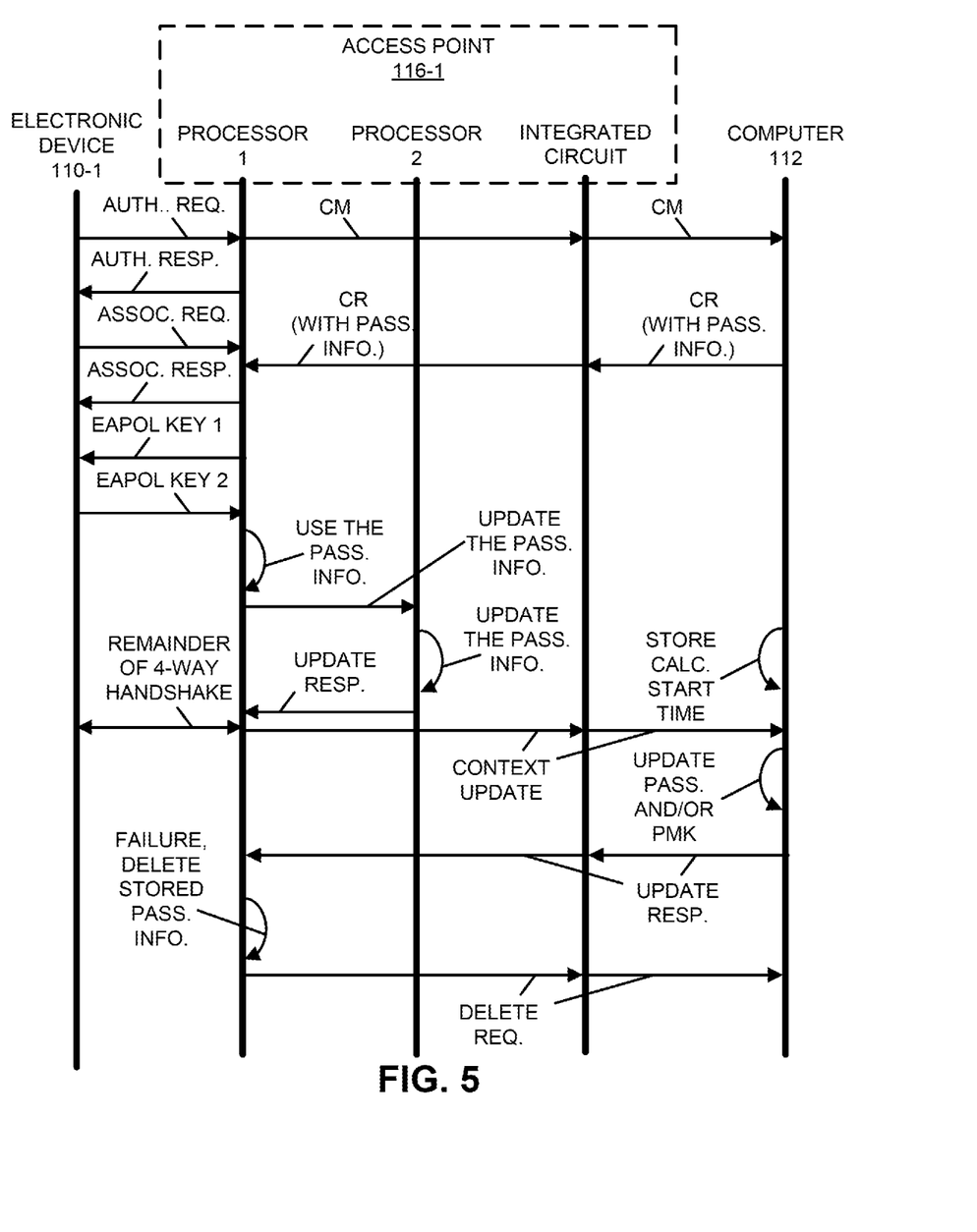
FIG. 5 is a drawing illustrating an example of communication among the electronic devices in FIG. 1 in accordance with an embodiment of the present disclosure.

Furthermore, as shown in FIG. 5, which presents a drawing illustrating an example of communication among electronic device 110-1, access point 116-1 and computer 112, when electronic device 110-1 tries to connect again with access point 116-1 (or another access point), that access point can get the matching key information from computer 112. Note that this approach may not change the basic DPSK call flow and may not be a graphical user interface (GUI)-level design change. Instead, the communication techniques may allow a customer to configure and use more DPSKs (such as 100-5000 DPSKs).

Additionally, during a subsequent attempt to establish a secure connection, the DPSK call flow may start from the beginning of the DPSK flow shown in FIG. 4 or may start at FIG. 5 (depending on whether computer has the DPSK key associated with electronic device 110-1 stored in memory). Note that computer 112 may store the following information in memory: a key matching calculation start time, a matched DPSK or PMK, a number of electronic devices associated with the DPSK or PMK (e.g., a '0' or a '1' to indicate a group DPSK or a non-group DPSK). The key matching calculation start time may be used to prevent a no report failure for an unexpected reason. For example, access point 116-1 may restart the key matching calculation again and may notify computer 112, so that computer 112 may update this key matching calculation start time if the matching calculation performed by access point 116-1 took too much time (e.g., 3 seconds).

In some embodiments, when there is a failure (such as a failure when updating the stored passphrase information), access point 116-1 may delete the locally stored passphrase information and may notify computer 112 to delete the stored passphrase information stored in memory associated with computer 112.

Figure 6:
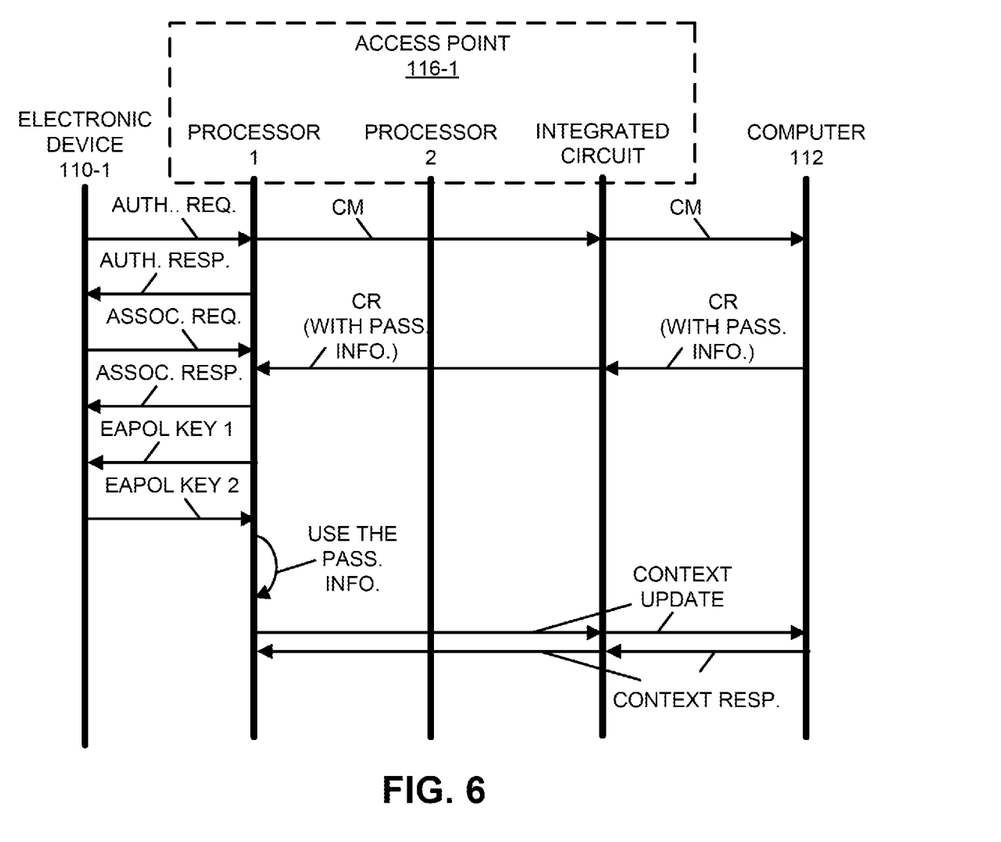
FIG. 6 is a drawing illustrating an example of communication among the electronic devices in FIG. 1 in accordance with an embodiment of the present disclosure.

FIG. 6, which presents a drawing illustrating an example of communication among electronic device 110-1, access point 116-1 and computer 112, shows the DPSK call flow after computer 112 stores the matched DPSK or PMK associated with electronic device 110-1 (which is sometimes referred to as 'binding the key').

While the preceding discussion illustrated the communication techniques with particular authentication techniques, in other embodiments the communication techniques may be used with additional authentication techniques. For example, the communication techniques may be used with or compatible with one or more types of EAP techniques, such as: Protected EAP (PEAP), a password-based and one-way authentication protocol (such as EAP-MD5), EAP-Transport Layer Security (EAP-TLS), EAP-Tunnel TLS (EAP-TTLS), EAP-Encrypted Key Exchange (EKE), Light-weight EAP (LEAP), EAP-TTLS-Challenge Handshake Authentication Protocol (CHAP), EAP-Generalized Pre-Shared key (GPSK), EAP-TTLS-Password Authentication Protocol (PAP), EAP-Generic Token Card (GTC), and/or a MAC-level authentication implemented, at least in part, using software. In at least some of these embodiments, the authentication computer may provision the access point with the information needed to support these authentication techniques, thereby offloading at least a portion of the authentication to the access point.

We now describe embodiments of an electronic device, which may perform at least some of the operations in the communication techniques. FIG. 7 presents a block diagram illustrating an example of an electronic device 700 in accordance with some embodiments, such as one of: base station 108, one of electronic devices 110, computer 112, one of access points 116, one of radio nodes 118, switch 128, or authentication computer 130. This electronic device includes processing subsystem 710, memory subsystem 712, and networking subsystem 714. Processing subsystem 710 includes one or more devices configured to perform computational operations. For example, processing subsystem 710 can include one or more microprocessors, graphics processing units (GPUs), ASICs, microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include DRAM, static random access memory (SRAM), and/or other types of memory. In some embodiments, instructions for processing subsystem 710 in memory subsystem 712 include: one or more program modules or sets of instructions (such as program instructions 722 or operating system 724, such as Linux, UNIX, Windows Server, or another customized and proprietary operating system), which may be executed by processing subsystem 710. Note that the one or more computer programs, program modules or instructions may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as antenna nodes 708, e.g., a metal pad or a connector, which can be coupled to the one or more antennas 720, or nodes 706, which can be coupled to a wired or optical connection or link. Thus, electronic device 700 may or may not include the one or more antennas 720. Note that the one or more nodes 706 and/or antenna nodes 708 may constitute input(s) to and/or output(s) from electronic device 700.) For example, networking subsystem 714 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 700 may be adapted or changed using pattern shapers (such as directors or reflectors) and/or one or more antennas 720 (or antenna elements), which can be independently and selectively electrically coupled to ground to steer the transmit antenna pattern in different directions. Thus, if one or more antennas 720 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 700 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Moreover, electronic device 700 may include a user-interface subsystem 730, such as: a mouse, a keyboard, a trackpad, a stylus, a voice-recognition interface, and/or another human-machine interface. In some embodiments, user-interface subsystem 730 may include or may interact with a touch-sensitive display in display subsystem 726.

Electronic device 700 can be (or can be included in) any electronic device with at least one network interface. For example, electronic device 700 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments instructions 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714 and/or of electronic device 700. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 722, operating system 724 (such as a driver for interface circuit 718) or in firmware in interface circuit 718. Alternatively or additionally, at least some of the operations in the communication techniques may be implemented in a physical layer, such as hardware in interface circuit 718.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer network device, comprising:
   an interface circuit configured to communicate with an electronic device and a computer;
   a processor coupled to the interface circuit; and
   memory, coupled to the processor, configured to store program instructions, wherein, when executed by the processor, the program instructions cause the electronic device to perform operations comprising:
   while attempting to establish a secure connection with the electronic device, receiving an authentication request associated with the electronic device;
   providing a context message addressed to the computer based at least in part on the authentication request, wherein the context message requests stored passphrase information associated with the electronic device;
   receiving, associated with the computer, a context response;
   when the context response indicates that there is no stored passphrase information associated with the electronic device, the computer network device performs second operations comprising:
     performing key matching to identify the passphrase associated with the electronic device; and
     providing, addressed to the computer, the identified passphrase associated with the electronic device or an encryption key corresponding to the identified passphrase for storage by the computer; and
   when the electronic device discontinues attempting to establish the secure connection while the computer network device is performing the key matching, the computer network device performs third operation comprising:
     continuing to perform the key matching and, when the passphrase is identified, providing the identified passphrase or the encryption key addressed to the computer.

2. The computer network device of claim 1, wherein the computer network device comprises: an access point, a switch, or a router.

3. The computer network device of claim 1, wherein the passphrase comprises a dynamic pre-shared key (DPSK) or another type of digital certificate.

4. The computer network device of claim 1, wherein, after performing the key matching, the operations comprise establishing the secure connection with the electronic device based at least in part on the identified passphrase or the encryption key.

5. The computer network device of claim 1, wherein the operations comprise storing the passphrase or the encryption key in memory associated with the computer network device.

6. The computer network device of claim 1, wherein, after receiving the context response and before performing the key matching, the operations comprise providing a notification addressed to the computer that indicates that the computer network device is performing or will perform the key matching.

7. The computer network device of claim 1, wherein, after receiving the context response and before performing the key matching, the operations comprise exchanging authentication parameters with the electronic device; and
   wherein the key matching is based at least in part on the authentication parameters.

8. The computer network device of claim 7, wherein exchanging the authentication parameters comprises:
   providing, addressed to the electronic device, a first message in a four-way handshake with the electronic device, wherein the first messages comprise a random number associated with the computer network device; and
   receiving, associated with the electronic device, a second message in the four-way handshake with the electronic device, wherein the second message comprises a second random number associated with the electronic device and a message integrity check (MIC).

9. The computer network device of claim 8, wherein the second message comprises inputs to a cryptographic calculation and an output of the cryptographic calculation.

10. The computer network device of claim 1, wherein, when the context response comprises the stored passphrase information, the operations comprise establishing the secure connection with the electronic device based at least in part on the stored passphrase information without performing the key matching.

11. The computer network device of claim 1, wherein the computer comprises a controller for the computer network device.

12. The computer network device of claim 1, wherein the computer comprises a remote authentication dial-in user service (RADIUS) server or an authentication, authorization, and accounting (AAA) server.

13. The computer network device of claim 1, wherein the computer network device comprises a second processor, and the key matching is performed by the second processor.

14. A non-transitory computer-readable storage medium for use in conjunction with a computer network device, the computer-readable storage medium storing program instructions that, when executed by the computer network device, cause the computer network device to perform operations comprising:
   while attempting to establish a secure connection with an electronic device, receiving an authentication request associated with the electronic device;

providing a context message addressed to a computer based at least in part on the authentication request, wherein the context message requests stored passphrase information associated with the electronic device;

receiving, associated with the computer, a context response;

when the context response indicates that there is no stored passphrase information associated with the electronic device, the computer network device performs second operations comprising:
- performing key matching to identify the passphrase associated with the electronic device; and
- providing, addressed to the computer, the identified passphrase associated with the electronic device or an encryption key corresponding to the identified passphrase for storage by the computer; and when the electronic device discontinues attempting to establish the secure connection while the computer network device is performing the key matching, the computer network device performs third operation comprising:
- continuing to perform the key matching and, when the passphrase is identified, providing the identified passphrase or the encryption key addressed to the computer.

15. The non-transitory computer-readable storage medium of claim 14, wherein, after receiving the context response and before performing the key matching, the operations comprise exchanging authentication parameters with the electronic device; and
wherein the key matching is based at least in part on the authentication parameters.

16. The non-transitory computer-readable storage medium of claim 14, wherein, when the context response comprises the stored passphrase information, the operations comprise establishing the secure connection with the electronic device based at least in part on the stored passphrase information without performing the key matching.

17. A method for performing key matching, comprising: by a computer network device:
while attempting to establish a secure connection with an electronic device, receiving an authentication request associated with the electronic device;
providing a context message addressed to a computer based at least in part on the authentication request, wherein the context message requests stored passphrase information associated with the electronic device;

receiving, associated with the computer, a context response;

when the context response indicates that there is no stored passphrase information associated with the electronic device, the computer network device performs operations comprising:
- performing the key matching to identify the passphrase associated with the electronic device; and
- providing, addressed to the computer, the identified passphrase associated with the electronic device or an encryption key corresponding to the identified passphrase for storage by the computer; and when the electronic device discontinues attempting to establish the secure connection while the computer network device is performing the key matching, the computer network device performs second operation comprising:
- continuing to perform the key matching and, when the passphrase is identified, providing the identified passphrase or the encryption key addressed to the computer.

18. The method of claim 17, wherein, after receiving the context response and before performing the key matching, the method comprises exchanging authentication parameters with the electronic device; and
wherein the key matching is based at least in part on the authentication parameters.

19. The method of claim 17, wherein, when the context response comprises the stored passphrase information, the method comprises establishing the secure connection with the electronic device based at least in part on the stored passphrase information without performing the key matching.

20. The method of claim 17, wherein, after receiving the context response and before performing the key matching, the method comprises providing a notification addressed to the computer that indicates that the computer network device is performing or will perform the key matching.

* * * * *